US012597800B1

(12) United States Patent
Dilley et al.

(10) Patent No.: US 12,597,800 B1
(45) Date of Patent: Apr. 7, 2026

(54) AGILE UNINTERRUPTIBLE POWER SUPPLY FOR EFFICIENT CRITICAL LOAD SUPPORT AND GRID CONTINGENCY RIDE-THROUGH

(71) Applicant: EPC Power Corporation, Poway, CA (US)

(72) Inventors: Devin Dilley, Poway, CA (US); M A Awal, Poway, CA (US)

(73) Assignee: EPC POWER CORPORATION, Poway, CA (US)

( * ) Notice: Subject to any disclaimer, the term of this patent is extended or adjusted under 35 U.S.C. 154(b) by 0 days.

(21) Appl. No.: 19/322,555

(22) Filed: Sep. 8, 2025

(51) Int. Cl.
*H02J 9/06* (2006.01)
*H02J 3/0012* (2026.01)
*H02J 3/32* (2026.01)

(52) U.S. Cl.
CPC ............ *H02J 9/062* (2013.01); *H02J 3/0012* (2020.01); *H02J 3/32* (2013.01); *H02J 9/067* (2020.01)

(58) Field of Classification Search
CPC .. H02J 9/062; H02J 3/0012; H02J 3/32; H02J 9/067
See application file for complete search history.

(56) References Cited

U.S. PATENT DOCUMENTS

| | | | | |
|---|---|---|---|---|
| 2006/0290205 A1 * | 12/2006 | Heber | H02J 3/007 | |
| | | | 307/65 | |
| 2012/0181871 A1 * | 7/2012 | Johansen | H02J 9/062 | |
| | | | 307/66 | |
| 2014/0368043 A1 * | 12/2014 | Colombi | H02J 3/1864 | |
| | | | 307/66 | |
| 2017/0093207 A1 * | 3/2017 | Park | H02J 7/865 | |
| 2021/0152017 A1 * | 5/2021 | Berger | H02J 3/32 | |
| 2021/0234396 A1 * | 7/2021 | Ghodke | H02J 9/061 | |
| 2022/0216726 A1 * | 7/2022 | Kamalasadan | H02J 9/062 | |
| 2022/0360083 A1 * | 11/2022 | Paatero | H02J 3/16 | |
| 2025/0373068 A1 * | 12/2025 | Kim | H02J 3/18 | |

FOREIGN PATENT DOCUMENTS

WO      WO-2025046181 A1 *   3/2025   ............. H02J 9/068

* cited by examiner

*Primary Examiner* — Daniel Cavallari
(74) *Attorney, Agent, or Firm* — FOLEY & LARDNER LLP

(57) ABSTRACT

The present disclosure provides a method for maintaining continuous power to a critical load. The method comprises providing a source side converter (SSC) configured to provide autonomous grid support including reactive power support during fault conditions and a load side converter (LSC) configured to support the critical load by boosting voltage at load terminals through autonomous injection of reactive current, each coupled to a DC energy storage. The method includes coupling the SSC to an AC source and coupling the LSC to the critical load. The AC source and the critical load are connected via a bypass connection including a ride-through inductor with measurement capability. Under nominal source conditions, the SSC and the LSC are controlled so that a majority of power consumed by the critical load flows through the bypass connection. The method involves monitoring electrical parameters of the bypass connection and compensating for critical load variations using either the SSC or LSC or both based on bypass connection measurements.

5 Claims, 7 Drawing Sheets

AGILE UNINTERRUPTIBLE POWER SUPPLY FOR EFFICIENT CRITICAL LOAD SUPPORT AND GRID CONTINGENCY RIDE-THROUGH

BACKGROUND

Conventional uninterruptable power supply (UPS) designs typically rely on either double-conversion architecture, where all load power passes through a pair of power converters at all times, or line-interactive systems, where the inverter maintains standby mode until a disturbance occurs. While double-conversion systems can ensure high-quality power output, they are often less efficient under nominal conditions due to continuous converter operation. In contrast, line-interactive systems improve efficiency but may suffer from transfer delays or voltage instability during source disturbances. Furthermore, although a double-conversion structure can shield the AC source from load variations, a line-interactive systems cannot smooth such variations if exhibited by the critical load.

Medium-voltage applications often require multiple transformers and additional switching equipment, adding system complexity and cost. Furthermore, many UPS systems lack coordinated, real-time control to actively regulate voltage and frequency while simultaneously synchronizing bypass paths for seamless reclosure after disturbances. As such, there is a need for an architecture that optimizes efficiency and can smooth load variations under nominal conditions while ensuring seamless, rapid, and stable response under abnormal conditions, without degrading power quality to the critical load.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1:
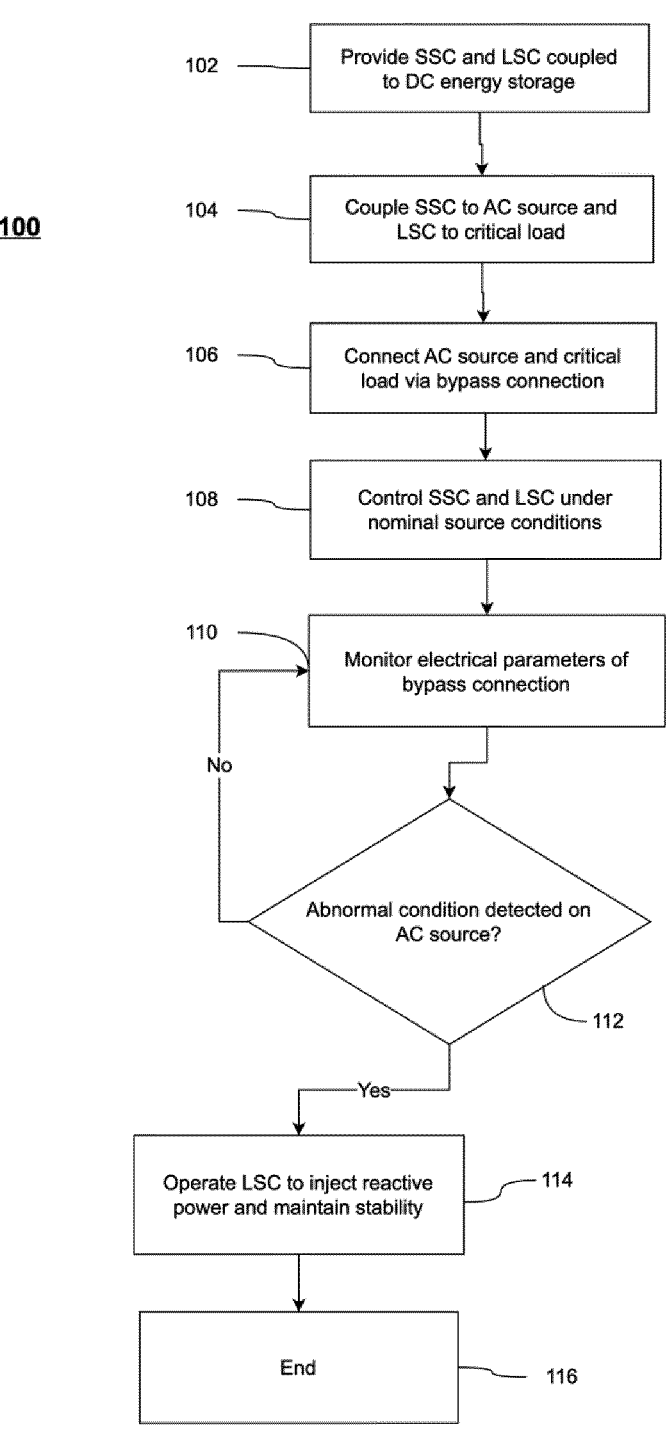
FIG. 1 illustrates a flowchart for a method of maintaining continuous power to a critical load, according to aspects of the present disclosure.

In the following description, reference is made to the accompanying drawings, which form a part hereof. In the drawings, similar symbols typically identify similar components, unless context dictates otherwise. The illustrative embodiments described in the description, drawings, and claims are not limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The systems and methods described herein enable a power conversion system for critical loads such as a hospital or data center, which simultaneously perform at least four key functions: (1) shielding a utility/AC source from any variation that may be presented by the load, (2) directing majority of the electrical power straight from the utility/AC source to the load-avoiding waste due to losses in power electronic converters, (3) autonomously responding to abnormal conditions on the utility/AC source side while maintaining stable voltage and frequency as seen by the load, obsoleting the need for fast opening/coordination of bypass breaker, and (4) autonomously maintaining the load side AC voltage synchronized with that of the utility/AC source side enabling seamless reclosure of the bypass connection after any abnormal condition/contingency on the utility/AC source side. The systems and methods described makes this possible using two high-performance converters, a special bypass connection with an inductor and associated electrical measurements, and fast control software. In normal operation, the system runs efficiently; during trouble, it instantly rallies to serve both the critical load as well as the utility/AC source-unlike a traditional UPS which only supports the load.

Referring to FIG. 1, a method 100 for maintaining continuous power to a critical load is implemented through a sequential process that addresses both nominal and abnormal source conditions. The method 100 begins with a step 102 where a source side converter (SSC) and a load side converter (LSC) are each coupled to a DC energy storage. The DC energy storage comprises a battery or a supercapacitor bank, providing backup power capability for the system. In some implementations, the SSC and LSC each receive control references over a high-speed digital link to enable coordinated operation and rapid response to changing conditions.

The method 100 continues with a step 104 where the SSC is coupled to an AC source and the LSC is coupled to the critical load. This coupling establishes the primary power flow paths for the system, with the SSC serving as the interface to the utility power source and the LSC serving as the interface to the load requiring uninterrupted power. A step 106 involves connecting the AC source and the critical load via a bypass connection including a ride-through inductor. The bypass connection provides a direct power transfer path that allows the majority of load power to flow without passing through the power conversion stages of the SSC and LSC during normal operating conditions.

Under nominal source conditions, the method 100 proceeds to a step 108 where the SSC and the LSC are controlled so that a majority of power consumed by the critical load flows through the bypass connection. This control strategy minimizes power flow through the converters themselves, reducing conversion losses and improving overall system efficiency. The step 108 involves coordinated control of both converters to maintain proper voltage and phase relationships while directing power flow through the bypass path. In some implementations, the control system operates the converters with appropriate power references to achieve this power flow distribution.

As shown in FIG. 1, the method 100 includes a step 110 for monitoring electrical parameters of the bypass connection. The monitoring includes measuring current through the bypass connection to track power flow and detect changes in load conditions or source characteristics. In some implementations, monitoring electrical parameters includes measuring AC voltage on a low-voltage or medium-voltage terminal of the SSC to provide additional information about system operating conditions. The monitoring function provides real-time data that enables the control system to respond to changing conditions and maintain stable operation. In some implementations, where the critical load exhibits rapid variability, unfavorable to the utility/AC source, the real-time measurements of the bypass connection is used by the SSC or the LSC or a combination of the two (SSC and LSC) to compensate for such variability to ensure a steady/smooth power consumption as seen by the utility/AC source side. In such implementations, the SSC may be operated in augmented grid-following mode or in augmented grid forming mode to enable load-smoothing.

The method 100 incorporates a decision step 112 that determines whether an abnormal condition has been detected on the AC source. The abnormal condition comprises at least one of: a voltage sag, a frequency deviation, or an upstream fault. If no abnormal condition is detected, the method 100 returns to the step 110 to continue monitoring electrical parameters, maintaining the normal operating mode where power flows primarily through the bypass connection. This monitoring loop ensures continuous assessment of system conditions and enables rapid detection of any changes that affect power quality or availability.

Upon detection of an abnormal condition on the AC source, the method 100 proceeds to a step 114 where the LSC is operated to inject reactive power into the critical load and maintain stable voltage and frequency independent of the AC source. With continued reference to FIG. 1, the step 114 represents the transition to backup operation mode where the LSC assumes responsibility for maintaining power quality to the critical load. The reactive power injection capability allows the LSC to boost the AC voltage seen by the load through the ride-through inductor, while simultaneously maintaining stable frequency and voltage characteristics. In some implementations, the method 100 further comprises resynchronizing load-side voltage to source-side voltage prior to reclosure of a breaker in the bypass connection when transitioning back to normal operation after the abnormal condition has cleared.

The method 100 concludes with a step 116 representing the end of the process sequence. The flowchart structure shown in FIG. 1 illustrates the decision-making logic that enables the system to automatically switch between normal bypass operation and backup converter operation based on detected source conditions. The sequential flow of operations ensures that the critical load receives continuous power regardless of disturbances or failures affecting the AC source, with the system capable of seamlessly transitioning between operating modes to maintain power continuity.

In some implementations, the detection of abnormal conditions and converter control response upon such detection is not necessary. The LSC is operated in grid-forming mode and its natural response to voltage deviations due to an AC fault on the source side prompts autonomous injection of reactive current into the ride-through inductor facilitating stable magnitude and frequency of AC voltage seen by the critical load. Such autonomous response obsoletes the need for fast controller coordination with the breaker in the bypass connection. In some implementations, where the SSC is operated in augmented grid forming mode, it also responds autonomously to AC faults to provide grid support, rides-through the fault and returns to pre-fault operating condition at fault clearance. Such implementations offer continuous support for the critical load as well as the AC utility/source.

Figure 2:
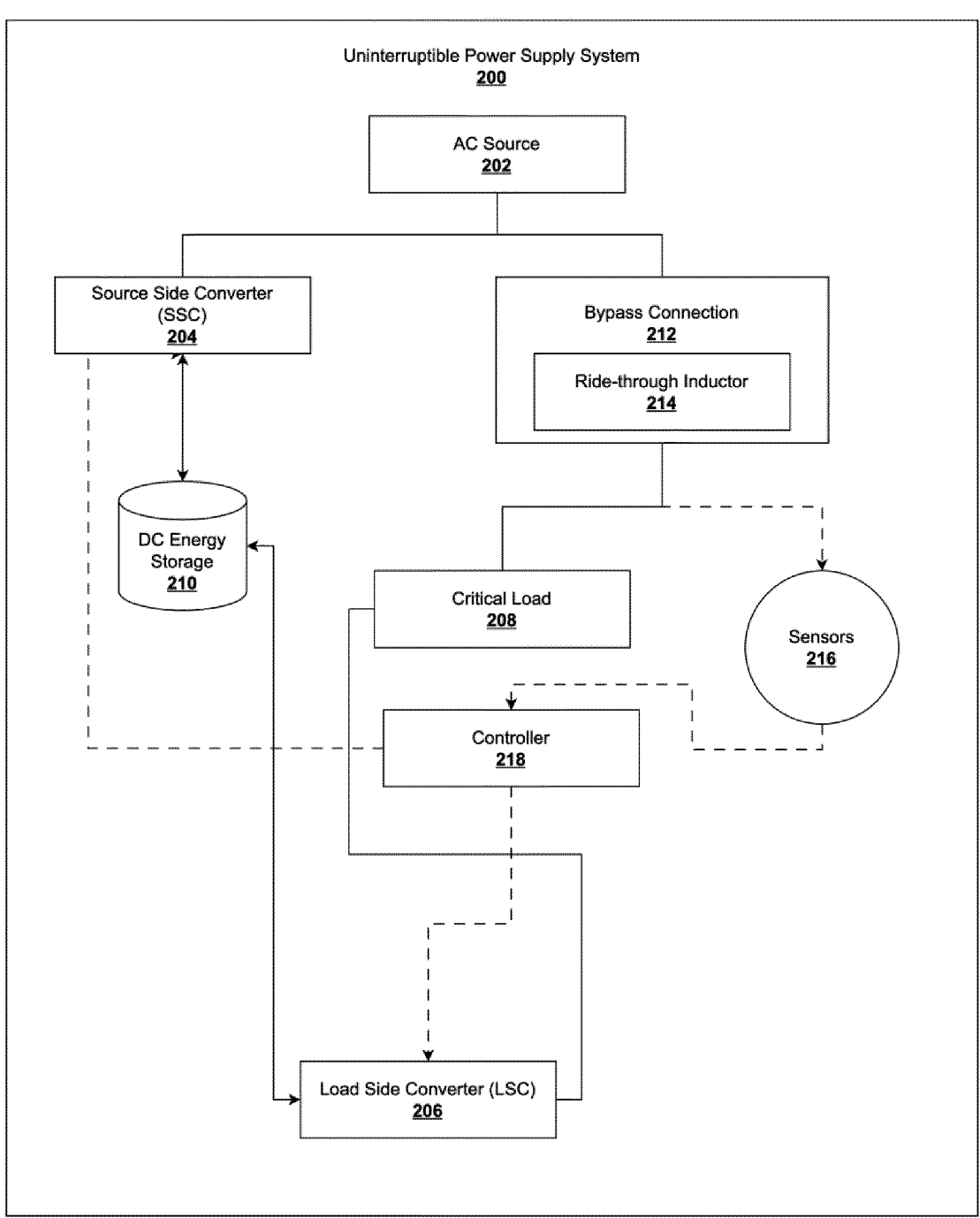
FIG. 2 illustrates a block diagram of an uninterruptible power supply system with bypass connection, according to aspects of the present disclosure.

Referring to FIG. 2, an uninterruptible power supply system 200 provides continuous power delivery through a dual converter architecture that coordinates multiple power flow paths. The uninterruptible power supply system 200 includes an AC source 202 that supplies primary electrical power to the system during normal operating conditions. A source side converter (SSC) 204 connects to the AC source 202 and serves as the interface between the utility power supply and the internal power management components of the uninterruptible power supply system 200. The SSC 204 performs power conversion and conditioning functions while maintaining synchronization with the AC source 202 during nominal operating conditions.

The uninterruptible power supply system 200 further includes a load side converter (LSC) 206 that connects to a critical load 208 requiring uninterrupted power supply. The LSC 206 functions as the primary interface between the power management system and the critical load 208, providing regulated voltage and frequency output regardless of disturbances affecting the AC source 202. A DC energy storage 210 connects to both the SSC 204 and the LSC 206, providing backup power capability when the AC source 202 experiences abnormal conditions. The DC energy storage 210 stores electrical energy that enables continued operation of the critical load 208 during power outages, voltage sags, or other disturbances affecting the primary power supply.

As shown in FIG. 2, a bypass connection 212 establishes a direct power transfer path between the AC source 202 and the critical load 208. The bypass connection 212 includes a ride-through inductor 214 that provides impedance control and enables reactive power injection during abnormal operating conditions. The ride-through inductor 214 allows the LSC 206 to boost the AC voltage delivered to the critical load 208 through reactive power injection while maintaining stable frequency and voltage characteristics. In some configurations, the bypass connection 212 comprises a breaker in series with the ride-through inductor 214 to provide isolation capability during fault conditions or maintenance operations.

The uninterruptible power supply system 200 incorporates sensors 216 that monitor electrical parameters associated with the bypass connection 212. The sensors 216 measure current flow through the bypass connection 212 to track power transfer and detect changes in load conditions or source characteristics. The sensors 216 also measure voltage parameters to provide comprehensive monitoring of system operating conditions. In some implementations, the sensors 216 measure both current and voltage to enable precise control of power consumption as seen by the AC utility and the power flow distribution between the bypass connection 212 and the converter paths through the SSC 204 and LSC 206.

With continued reference to FIG. 2, a controller 218 connects to both the SSC 204 and the LSC 206 to coordinate their operation based on measured system conditions. The controller 218 receives measurement data from the sensors 216 and determines the appropriate operating mode and power references for the uninterruptible power supply system 200. During nominal source conditions, the controller 218 operates the SSC 204 and the LSC 206 to minimize power flow through the converters and transfer a majority of load power through the bypass connection 212. This control strategy reduces conversion losses and improves overall system efficiency by directing power flow through the direct transfer path provided by the bypass connection 212. The controller 218 coordinates the power references and control signals sent to both converters to maintain proper voltage and phase relationships while achieving the desired power flow distribution. Furthermore, the controller performs load-smoothing as seen by the AC utility by means of generating appropriate voltage/current/power references for the SSC and the LSC.

During abnormal source conditions, the controller 218 transitions the uninterruptible power supply system 200 to backup operation mode where the LSC 206 assumes primary responsibility for maintaining power quality to the critical load 208. The controller 218 operates the LSC 206 during abnormal source conditions to inject reactive power to the critical load 208 and to maintain stable voltage and frequency independent of disturbances affecting the AC source 202. The controller 218 coordinates breaker operation for fault isolation when the bypass connection 212 includes switching devices that enable disconnection of the direct power transfer path. In some configurations, each of the SSC 204 and LSC 206 connects to a separate DC energy storage device, allowing independent backup power capability and enhanced system reliability through redundant energy storage resources. In some configurations, the system does not alter operating modes; rather, LSC operates in grid-forming mode and autonomously maintains sufficiently high and stable voltage magnitude and frequency by means of reactive power injection into the ride-through inductor attributed by the inherent response of grid forming control to voltage deviations. The SSC can also respond autonomously to grid events while operating in augmented grid-forming mode. No coordination is required between the controller and the bypass breaker to retain continued support of the critical load and the AC utility/source. The system can maintain stable operation without opening the bypass breaker during an AC fault on the utility/source side. However, the bypass breaker may be opened over slow data-links/externally to reduce losses.

Figure 3:
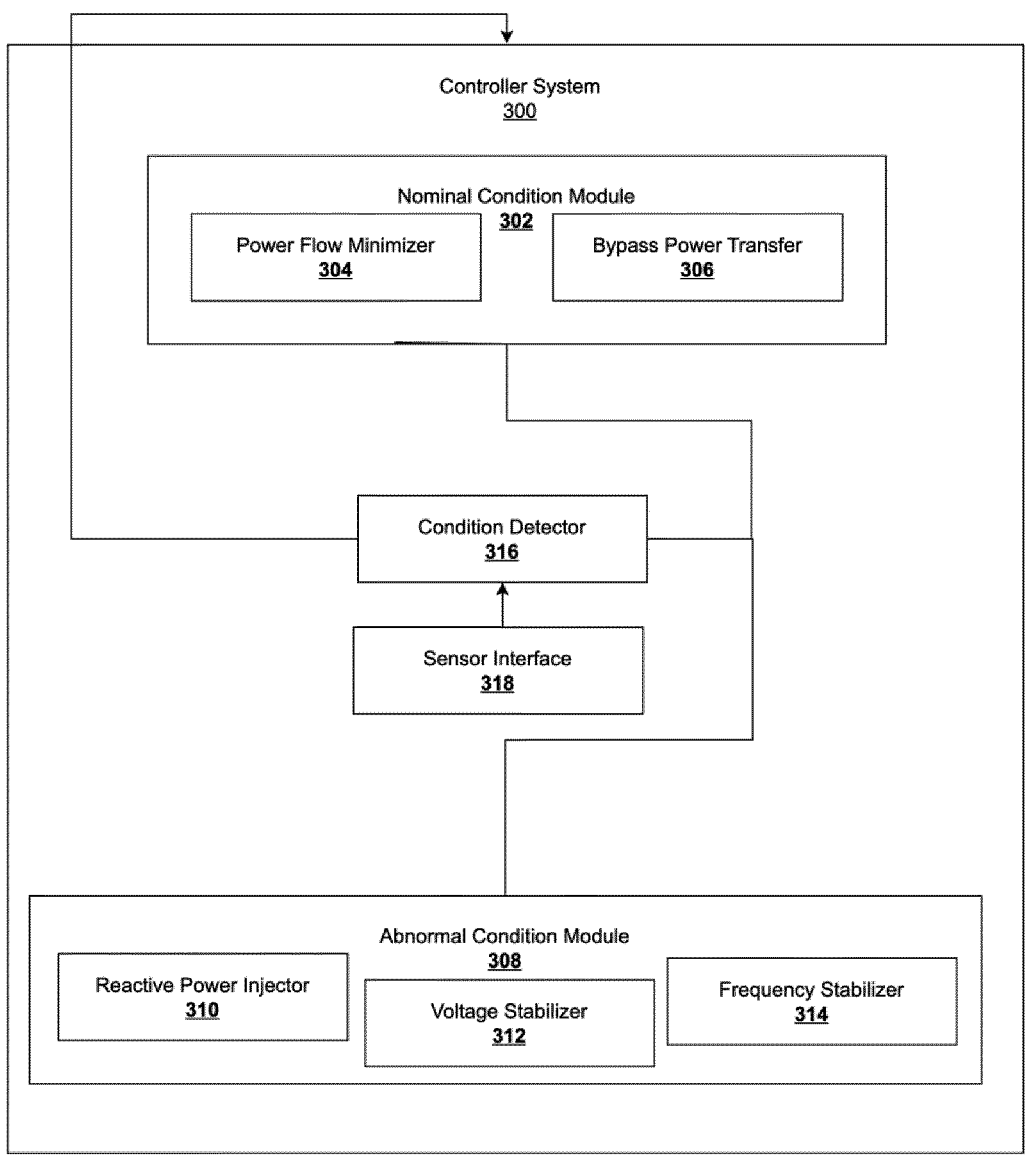
FIG. 3 illustrates a block diagram of a controller system for the uninterruptible power supply system of FIG. 2, according to aspects of the present disclosure.

Referring to FIG. 3, a controller system 300 provides comprehensive power management through specialized modules that enable continuous operation supporting both the critical load and the AC grid without requiring mode transitions. The controller system 300 incorporates a nominal condition module 302 that manages power flow distribution during stable source conditions, and an abnormal condition module 308 that provides seamless power quality enhancement when disturbances affect the primary power supply. Unlike conventional systems that must detect and react to abnormal conditions—introducing delays and potential load flicker—this system maintains uninterrupted operation regardless of breaker status. A condition detector 316 interfaces with system monitoring components to coordinate the operational state and optimize control responses based on detected power conditions. A sensor interface 318 connects the condition detector 316 to measurement devices throughout the power supply system, enabling real-time assessment of electrical parameters and continuous power quality management.

The nominal condition module 302 includes a power flow minimizer 304 and a bypass power transfer 306 that work together to optimize system efficiency during normal operating conditions while maintaining continuous grid support capability. The power flow minimizer 304 coordinates the operation of both source side and load side converters to reduce power processing through the conversion stages, thereby minimizing losses and improving overall system performance without interrupting power delivery. The bypass power transfer 306 directs the majority of load power through the direct transfer path, allowing the converters to operate at reduced power levels while maintaining proper voltage and phase relationships continuously. The nominal condition module 302 generates control references for both converters to achieve the desired power flow distribution through coordinated operation that requires no mode switching, making the system particularly suitable for datacenter and critical load applications where uninterrupted operation is essential.

As shown in FIG. 3, the abnormal condition module 308 contains a reactive power injector 310, a voltage stabilizer 312, and a frequency stabilizer 314 that collectively maintain power quality during source disturbances without requiring system mode changes or breaker operations. The reactive power injector 310 controls the load side converter to inject reactive power into the critical load through the ride-through inductor, enabling voltage boosting when the source experiences voltage sags while maintaining continuous operation. The voltage stabilizer 312 maintains stable voltage output to the critical load independent of source voltage variations, while the frequency stabilizer 314 ensures consistent frequency characteristics regardless of source frequency deviations. The abnormal condition module 308 enables the load side converter to simultaneously perform voltage boosting through reactive power injection and maintain stable frequency and voltage during abnormal conditions, providing comprehensive power quality management without interrupting power flow or requiring rapid breaker switching that could introduce load disturbances.

The condition detector 316 processes measurement data received through the sensor interface 318 to optimize the operational coordination of the controller system 300 without requiring mode transitions. The condition detector 316 analyzes voltage levels, frequency characteristics, and current flow patterns to continuously adjust system operation for both normal operating conditions and abnormal conditions such as voltage sags, frequency deviations, or upstream faults. The seamless architecture enables the system to support both the nominal condition module 302 and abnormal condition module 308 simultaneously, optimizing power flow through the bypass connection while providing continuous power quality enhancement through converter-based conditioning. This continuous operation capability eliminates the delays inherent in traditional systems that must detect abnormal conditions and switch operating modes, thereby avoiding potential load flicker and ensuring uninterrupted power delivery from the DC energy storage.

With continued reference to FIG. 3, the sensor interface 318 provides high-speed data acquisition capabilities that enable continuous optimization of power conditions and coordinated response from the controller system 300 without requiring mode switching. The sensor interface 318 processes current measurements from the bypass connection and voltage measurements from various points in the power supply system to provide comprehensive monitoring of system operating conditions while maintaining uninterrupted operation. The controller system 300 performs continuous synchronization by using voltage measurements on the source side to maintain proper AC voltage relationships between the load side and source side, ensuring smooth operation regardless of breaker status and eliminating the need for rapid breaker operations. The sensor interface 318 communicates measurement data to both the condition detector 316 and the active control modules simultaneously, enabling closed-loop control of power flow distribution and power quality parameters throughout all operating conditions without interruption, making this architecture ideal for mission-critical applications where continuous power delivery is paramount.

Figure 4:
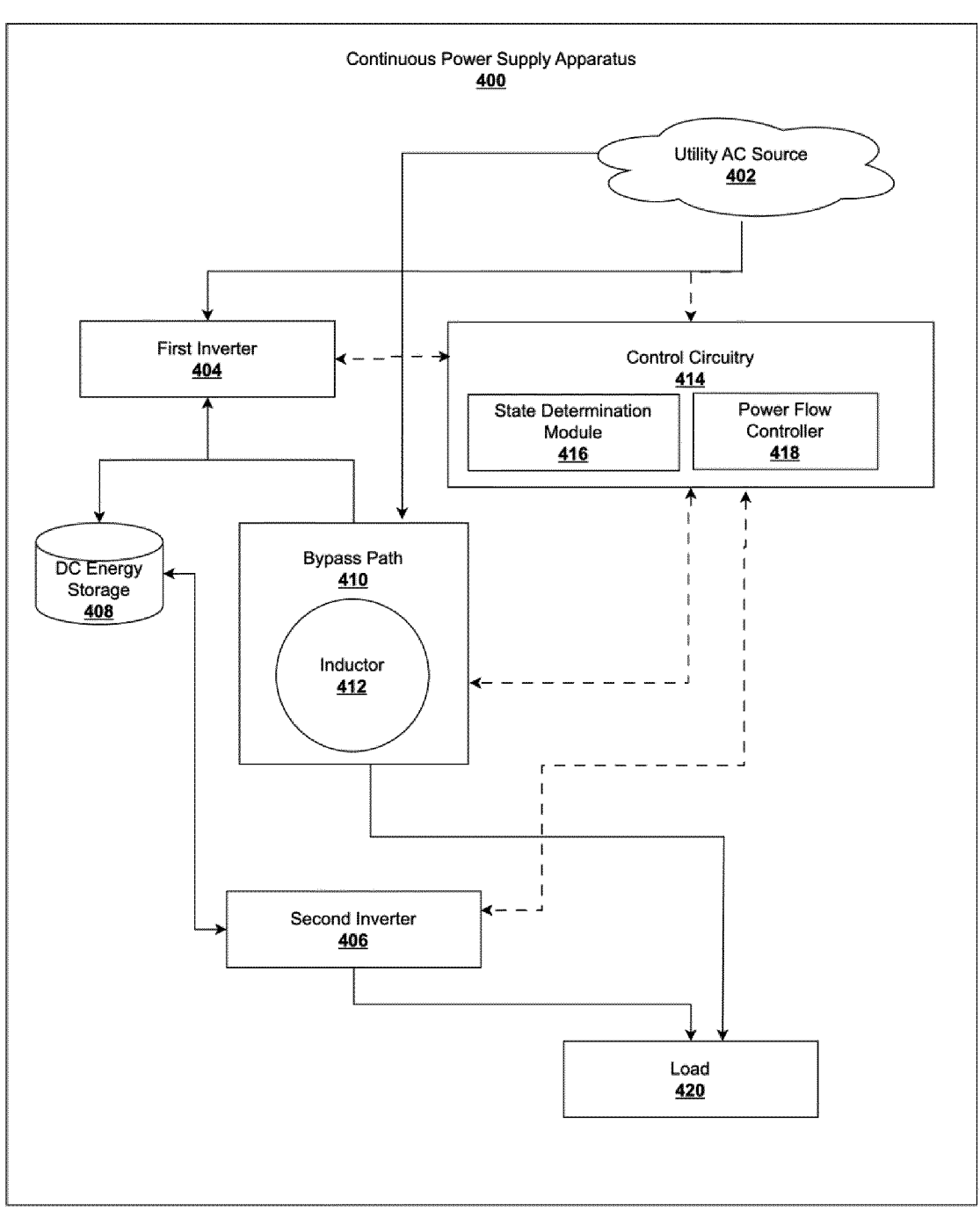
FIG. 4 illustrates a block diagram of a continuous power supply apparatus with dual inverters, according to aspects of the present disclosure.

Referring to FIG. 4, a continuous power supply apparatus 400 provides uninterrupted power delivery through a dual inverter configuration that smooths load variations as seen by the utility source. The continuous power supply apparatus 400 includes a utility AC source 402 that supplies primary electrical power during normal operating conditions. A first inverter 404 connects to the utility AC source 402 and operates in an augmented grid-forming mode to autonomously respond to grid events while maintaining stable voltage and frequency. The first inverter 404 performs power conversion functions while maintaining synchronization with the utility AC source 402. In some configurations, the first inverter 404 couples to the utility AC source 402 through a transformer that provides voltage level conversion and electrical isolation between the utility supply and the power conversion components.

The continuous power supply apparatus 400 further includes a second inverter 406 that connects to a load 420 requiring continuous power supply. The second inverter 406 operates continuously in grid-forming mode to autonomously maintain sufficiently high and stable voltage magnitude and frequency through reactive power injection into the ride-through inductor, regardless of disturbances affecting the utility AC source 402. The second inverter 406 couples to the load 420 through a transformer in some implementations, enabling voltage level matching and providing electrical isolation between the power conversion system and the connected load. A DC energy storage 408 connects to both the first inverter 404 and the second inverter 406, providing backup power capability when the utility AC source 402 experiences abnormal conditions. The DC energy storage 408 stores electrical energy that enables continued operation of the load 420 during power outages, voltage variations, or other disturbances affecting the primary power supply.

As shown in FIG. 4, a bypass path 410 establishes a direct power transfer route between the output of the first inverter 404 and the input of the second inverter 406. The bypass path 410 includes an inductor 412 that allows the second inverter 406 to maintain stable voltage and frequency characteristics through autonomous reactive power injection, attributed by the inherent response of grid-forming control to voltage deviations, without requiring mode transitions or breaker operations. The bypass path 410 remains closed during both normal and abnormal source conditions, allowing the system to maintain stable operation even during AC faults on the utility side. The bypass breaker may be opened over slow data-links or externally to reduce losses, but this is not required for maintaining power quality or system stability.

With continued reference to FIG. 4, control circuitry 414 generates appropriate voltage, current, and power references for both inverters to smooth load variations as seen by the utility AC source 402. The control circuitry 414 includes a state determination module 416 that processes electrical parameters from the utility AC source 402 and the bypass path 410. The state determination module 416 analyzes voltage levels, frequency characteristics, and power quality parameters to enable continuous optimization of power flow and smooth loading of the AC source 402. A power flow controller 418 within the control circuitry 414 manages the distribution of power through coordinated reference generation for both inverters while maintaining uninterrupted operation without mode switching.

The power flow controller 418 generates references that enable both inverters to operate continuously in their respective grid-forming modes while optimizing overall system efficiency. While the second inverter 406 is always operated in grid forming mode, the first inverter 404 may be operated in either in augmented grid forming or grid following mode. The power flow controller 418 coordinates the operation of both the first inverter 404 and the second inverter 406 through appropriate reference generation that maintains proper voltage and phase relationships. The control circuitry 414 enables continuous power quality enhancement through converter-based conditioning while maintaining uninterrupted operation. The continuous power supply apparatus 400 includes communications circuitry that supports real-time reference updates between the first inverter 404 and the second inverter 406, enabling coordinated response without requiring rapid breaker switching or mode transitions.

The system maintains continuous operation through the autonomous response of both inverters operating in grid-forming modes, without requiring coordination between the controller and bypass breaker. The control circuitry 414 generates references that enable the second inverter 406 to maintain stable voltage and frequency through inherent grid-forming control response to voltage deviations. The power flow controller 418 optimizes system performance through appropriate reference generation while maintaining uninterrupted power delivery through both the bypass path and converter-based conditioning. The control circuitry 414 generates appropriate references for the first inverter 404 and second inverter 406 to present a steady/smooth load to the utility AC source 402. The control circuitry 414 enables continuous reactive power injection capability through the inductor 412 without requiring mode transitions or breaker operations. In configurations where the inverters operate at medium voltage levels, the first inverter 404 and second inverter 406 connect directly to medium-voltage buses without transformers, providing simplified system architecture while maintaining the same autonomous grid-forming capabilities.

Figure 5:
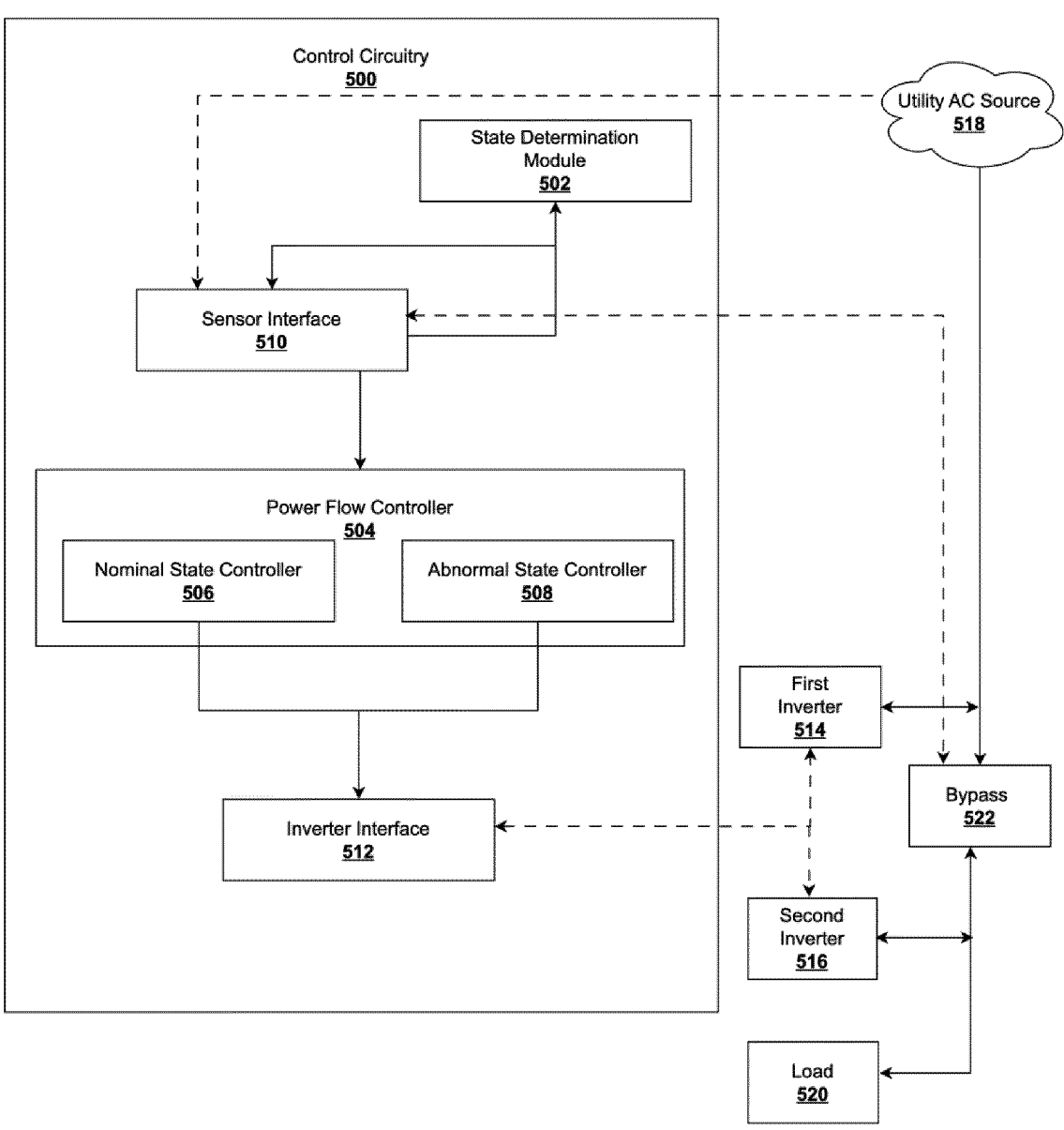
FIG. 5 illustrates a block diagram of a control system for the uninterruptible power supply, according to aspects of the present disclosure.

Referring to FIG. 5, a control circuitry 500 provides comprehensive power management for the uninterruptible power supply system through specialized control modules that coordinate inverter operation and maintain grid stability. The control circuitry 500 incorporates a state determination module 502 that analyzes electrical parameters from the utility AC source 518 to determine appropriate system operating modes. A power flow controller 504 within the control circuitry 500 manages the distribution of power between bypass paths and converter-based conditioning while maintaining coordinated operation of both inverters. The control circuitry 500 interfaces with external components through a sensor interface 510 and an inverter interface 512 that enable real-time coordination and autonomous response to changing grid and load conditions. The modular architecture of the control circuitry 500 allows independent operation of control functions while maintaining coordinated system-level performance through interconnected communication paths.

The state determination module 502 connects to the sensor interface 510 that processes measurement data from the utility AC source 518 and system monitoring points. The sensor interface 510 collects voltage levels, current measurements, and frequency characteristics to provide comprehensive system monitoring capabilities. The state determination module 502 analyzes the processed measurement data to enable autonomous response to both normal operating variations and abnormal conditions such as voltage sags, frequency deviations, or upstream faults. The sensor interface 510 enables high-speed data acquisition that supports rapid detection and response to maintain stable system operation. The state determination module 502 generates control signals that activate appropriate control functions within the power flow controller 504 based on detected grid and load conditions.

As shown in FIG. 5, the power flow controller 504 contains a nominal state controller 506 and an abnormal state controller 508 that provide specialized control functions for different operating conditions. The nominal state controller 506 manages power flow distribution during stable grid conditions, coordinating the operation of both the first inverter 514 and second inverter 516 to optimize system efficiency while maintaining proper power flow through bypass connections. The abnormal state controller 508 assumes control when disturbances occur, providing enhanced power conditioning through reactive power injection and voltage regulation capabilities. The power flow controller 504 receives state indication signals from the state determination module 502 and activates the appropriate controller to maintain continuous power delivery to the load 520. Both the nominal state controller 506 and the abnormal state controller 508 generate control references that coordinate inverter operation without requiring system mode transitions.

The control circuitry 500 interfaces with power conversion components through an inverter interface 512 that enables coordinated operation of both the first inverter 514 and the second inverter 516. The inverter interface 512 distributes control references generated by the power flow controller 504 to both inverters, enabling synchronized operation and proper power flow management. The first inverter 514 connects to the utility AC source 518 and operates to provide grid interface functions while maintaining synchronization with the utility supply. In some configurations, the first inverter 514 may be operated in augmented grid-following mode. The second inverter 516 connects to the load 520 and operates to provide regulated power output with voltage and frequency control capabilities. The inverter interface 512 enables bidirectional communication between the control circuitry 500 and both inverters, supporting closed-loop control and status monitoring. The inverter interface 512 distributes control references that enable both inverters to operate continuously in their respective augmented grid-forming or grid-following modes while optimizing overall system efficiency and smoothing load as seen by the utility AC source 518. The inverter interface 512 also receives status information enabling closed-loop control that maintains both load smoothing and grid support capabilities. The bypass 522 establishes direct power transfer paths between the utility AC source 518, the first inverter 514, the second inverter 516, and the load 520.

With continued reference to FIG. 5, the utility AC source 518 provides primary electrical power to the system and connects to the sensor interface 510 for continuous monitoring of grid conditions. The utility AC source 518 also connects through the bypass 522 to enable direct power transfer paths within the system. The load 520 represents critical equipment requiring uninterrupted power delivery and connects to the second inverter 516 for regulated power supply. The bypass 522 interconnects the utility AC source 518, first inverter 514, second inverter 516, and load 520, enabling multiple power flow paths and operational flexibility. The control circuitry 500 coordinates operation through the sensor interface 510 and inverter interface 512 to maintain continuous power delivery while providing power conditioning and backup capabilities. The system architecture shown in FIG. 5 enables seamless operation between normal and abnormal conditions without requiring rapid switching or mode transitions.

The control circuitry 500 maintains continuous operation through coordinated control of both inverters based on system conditions detected by the state determination module 502. During normal conditions, the nominal state controller 506 coordinates the first inverter 514 and second inverter 516 to optimize efficiency while maintaining proper power flow distribution through the bypass 522. The nominal state controller 506 generates references that enable efficient power transfer while maintaining system stability and power quality. When abnormal conditions occur, the state determination module 502 activates the abnormal state controller 508, which maintains power quality through enhanced converter control and reactive power injection capabilities. The abnormal state controller 508 coordinates inverter operation to provide backup power while maintaining stable output voltage and frequency to the load 520. The modular control architecture enables flexible system configuration while maintaining autonomous response capabilities.

The modular architecture of the control circuitry 500 enables flexible system configurations while maintaining consistent control capabilities across different applications. The sensor interface 510 adapts to various measurement requirements while providing standardized data processing for the state determination module 502. The inverter interface 512 similarly adapts to different inverter configurations while enabling consistent control reference distribution and status monitoring. The power flow controller 504 maintains consistent control algorithms through the nominal state controller 506 and abnormal state controller 508 regardless of specific system configuration. The control circuitry 500 supports both low-voltage and medium-voltage applications through configurable interfaces that maintain coordinated inverter operation and continuous power delivery capabilities without requiring mode transitions or complex switching operations.

Figure 6:
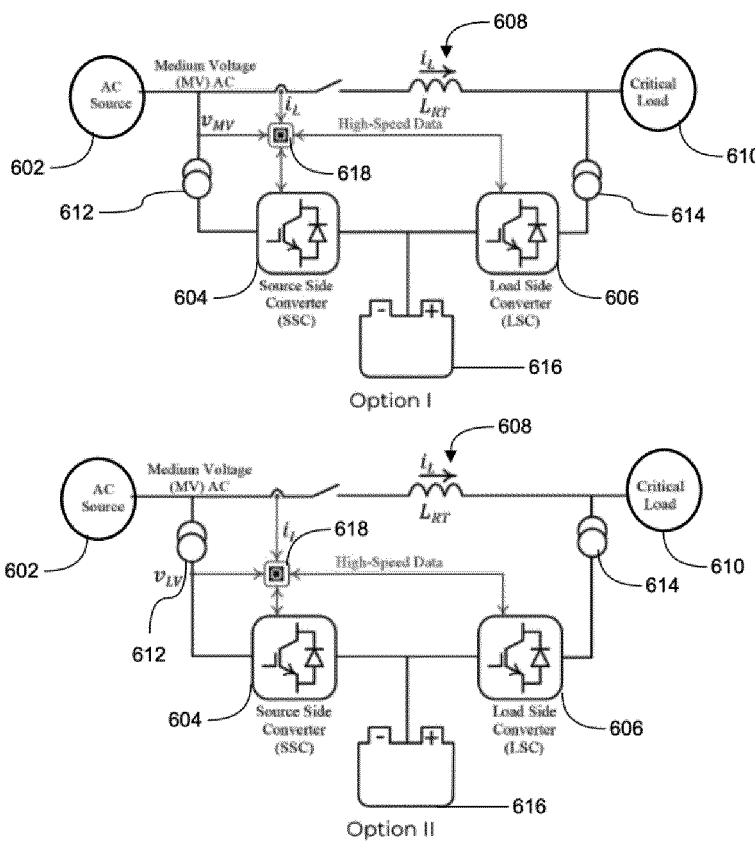
FIG. 6 illustrates circuit diagrams of an agile UPS system with dual converter architecture options, according to aspects of the present disclosure.

FIG. 6 illustrates circuit diagrams of an agile UPS system with dual converter architecture options, labeled as Option I and Option II. Each configuration shows an AC source 602 connected to a source side converter (SSC) 604 through a transformer 612. A load side converter (LSC) 606 connects to a critical load 610 through a transformer 614. The SSC 604 and LSC 606 are interconnected through a ride-through inductor 608. A DC energy storage 616 connects to both converters in each configuration. A measurement point 618 is positioned to monitor electrical parameters along the bypass connection path. The bypass connection through the ride-through inductor 608 enables power transfer between the source and load sides.

Option I and Option II present different arrangements of the components while maintaining the same fundamental architecture. Both options incorporate the AC source 602, transformers 612 and 614, converters 604 and 606, and DC energy storage 616. The configurations differ in their connection arrangements between the components while preserving the basic characteristics of the system. The measurement point 618 enables monitoring of current through the bypass connection, with voltage measurements on the source side. The converters 604 and 606 are arranged to enable power flow control and voltage regulation through the ride-through inductor 608.

Referring to Option I in FIG. 6, the agile UPS system incorporates a dual converter architecture that provides flexible power conditioning and backup capabilities for medium voltage applications. The system includes the source side converter (SSC) 604 and the load side converter (LSC) 606 arranged in a configuration that enables efficient power transfer during normal operation as well as smoothing of load variation as seen by the AC utility/source. This configuration also enables autonomous ride-through of faults on the AC utility/source side, i.e., (1) by SSC (604): providing voltage support to the utility/source during the fault and returning to pre-fault load level (as seen by the utility/source) immediately at fault clearance, (2) by LSC (606): autonomous boosting of voltage at load terminal by reactive current injection into the ride-though inductor during fault and maintaining the load terminal voltage synchronized with that on the source side of the bypass breaker (if the breaker was opened during fault) after fault clearance so as to enable seamless reclosure of the bypass connection. The SSC 604 connects to the medium voltage AC source 602 through a low-voltage to medium voltage transformer 612, such as a 690V/34.5 kV transformer, allowing the use of lower voltage power electronics while interfacing with medium voltage distribution systems. The LSC 606 feeds the critical load 610 through another low-voltage to medium voltage transformer 614 of similar rating, providing isolation and voltage matching between the power electronics and the medium voltage load connection.

The ride-through inductor 608 (LRT) forms a central component of the bypass connection, linking the medium voltage sides of the SSC 604 and LSC 606 transformers through an optional breaker arrangement. This inductor connection enables power flow between the source and load sides while providing the reactive impedance needed for voltage regulation and power flow control. The bypass connection allows the majority of load power to transfer directly from the AC source 602 to the critical load 610 without passing through the power conversion stages of the converters during normal operating conditions. The inductor value and characteristics are selected to provide appropriate impedance for power flow control while enabling reactive power injection capabilities during abnormal source conditions.

High-speed data measurement capabilities are integrated throughout the system to enable precise monitoring and control of electrical parameters. Current measurement ($i_L$) through the bypass connection at measurement point 618 provides real-time information about power flow magnitude and direction, enabling the control system to track load variations and source conditions. Voltage measurements are implemented at multiple points within the system, including both low-voltage and medium-voltage measurement options on the SSC 604 transformer 612 connections. The low-voltage side measurement ($v_{LV}$) provides information about the converter output characteristics, while the medium-voltage side measurement ($v_{MV}$) offers direct monitoring of the distribution system voltage conditions.

The high-speed measurements from the voltage and current sensors at measurement point 618 enable the source side converter 604 to compensate for load variations so that power consumed from the AC source 602 remains invariant with regard to load changes presented by the critical load 610. This compensation capability relies on rapid detection of load current changes through the bypass connection measurement and corresponding adjustment of the SSC 604 output to maintain constant source power consumption. The control system processes the measurement data and generates appropriate control references for the SSC 604 to counteract load variations, effectively decoupling the source-side power consumption from load-side power demand fluctuations. This invariant source power consumption characteristic improves power quality at the source connection point and reduces the impact of load variations on the upstream distribution system.

Figure 7:
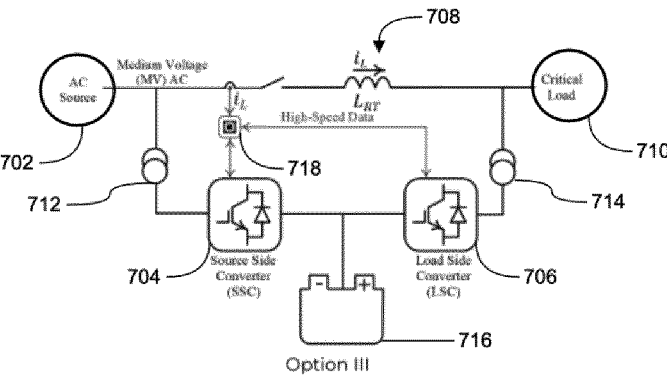
FIG. 7 illustrates a circuit diagram of the uninterruptible power supply system with dual converter architecture, according to aspects of the present disclosure.

FIG. 7 illustrates a circuit diagram of the uninterruptible power supply system with dual converter architecture. The diagram shows a medium voltage AC source 702 connected to a source side converter (SSC) 704 through a first transformer 712. A load side converter (LSC) 706 connects to a critical load 710 through a second transformer 714. The SSC 704 and LSC 706 are interconnected through a ride-through inductor 708. A data link 718 provides communication between the converters. A DC energy storage 716 connects to both converters. The system incorporates measurement points for monitoring electrical parameters during operation. The bypass connection through the ride-through inductor 708 enables direct power transfer between the source and load sides during normal operating conditions.

The SSC 704 connects to a DC energy storage 716 that provides energy storage for backup operation during source disturbances or outages. The load side converter (LSC) 706 connects to the same DC energy storage 716 as the SSC 704, enabling coordinated operation and shared energy storage resources during backup operation modes. The LSC 706 feeds power to a critical load 710 through a second transformer 714, providing regulated voltage and frequency output regardless of disturbances affecting the medium voltage AC source 702. A ride-through inductor 708 establishes a connection between the SSC 704 and LSC 706, creating a bypass path that allows power to flow directly between the source and load sides during normal operating conditions. The ride-through inductor 708 provides impedance control and enables reactive power injection capabilities when the LSC 706 operates to boost voltage levels during abnormal source conditions.

High-speed data measurement capabilities are integrated throughout the system to provide comprehensive monitoring of electrical parameters during operation. Current monitoring through the bypass connection tracks the magnitude and direction of power flow between the source and load sides, enabling the control system to detect changes in load conditions and source characteristics. The current measurement provides real-time feedback that supports coordinated control of both converters to maintain desired power flow distribution and system stability. The measurement system processes current data at high speed to enable rapid response to changing conditions and seamless transitions between operating modes.

The voltage measurements include monitoring on both the low voltage and medium voltage sides of the SSC 704 transformer connections, offering flexibility in measurement configuration based on specific application requirements. The low voltage side measurement provides information about converter output characteristics and power electronics performance, while the medium voltage side measurement offers direct monitoring of distribution system voltage conditions and power quality parameters. The dual measurement capability enables the control system to select the appropriate measurement point based on operating conditions and control requirements.

The converter implementations of FIG. 7 incorporate switching elements arranged in configurations that enable bidirectional power flow and reactive power control capabilities. The SSC 704 contains switching elements that interface with the medium voltage AC source 702 through the first transformer 712, providing power conversion and conditioning functions while maintaining synchronization during normal operating conditions. The LSC 706 incorporates similar switching element arrangements that enable power delivery to the critical load 710 with voltage and frequency regulation capabilities independent of source conditions. Both converters operate under coordinated control to achieve desired power flow distribution between the bypass connection and the converter paths based on detected system conditions.

The medium voltage implementation shown in FIG. 7 enables direct interface with distribution system voltage levels while utilizing lower voltage power electronics through transformer connections. The transformer arrangements provide voltage level conversion between the medium voltage distribution system and the power conversion components, enabling the use of standard power electronics while interfacing with higher voltage applications. The first transformer 712 and second transformer 714 also provide electrical isolation between the distribution system and the power conversion components, enhancing system safety and reducing the impact of faults or disturbances on either side of the isolation barrier. The medium voltage capability extends the application range of the uninterruptible power supply system to industrial and utility applications that operate at distribution voltage levels.

The protection incorporated in FIG. 7 provides enhanced fault isolation and system protection capabilities during abnormal operating conditions. The system enables rapid disconnection of the medium voltage AC source 702 when faults or disturbances occur, preventing damage to system components and enabling continued operation in backup mode. The operation coordinates with the converter control system to ensure seamless transitions between grid-connected and islanded operating modes without interrupting power delivery to the critical load 710. The protection system monitors electrical parameters and activates protection when predetermined thresholds are exceeded, providing automatic fault response and system protection without requiring manual intervention. The data link 718 facilitates communication between the SSC 704 and LSC 706 to coordinate these protection functions additional to its primary objective to facilitate power conversion control of the system.

According to one implementation example, a data center with a 34.5 kV feed from the utility deploys the MV Agile UPS described herein. The SSC in the MV Agile UPS is transformer-connected to the utility feed. The LSC in the MV Agile UPS is transformer-connected to load bus and the bypass breaker is normally closed. During normal operation, 90%+ of load power transits the bypass; SSC and LSC adjust only for residual imbalances. Upon a utility sag to 70% nominal voltage, the LSC immediately injects reactive power to restore load voltage, while SSC adjusts draw to maintain upstream stability. Transition is seamless, with recorded disturbance duration <20 ms. Different threshold values may be utilized, depending on the particular implementation.

While specific embodiments and examples have been described, numerous variations and modifications are possible within the scope of the invention. The specific control algorithms, communication protocols, and system configurations may be adapted to particular requirements and constraints without departing from the fundamental principles of the invention.

What is claimed is:

1. An uninterruptible power supply system comprising:
   a source side converter (SSC) coupled to an AC source and configured to provide autonomous grid support including reactive power support during fault conditions;
   a load side converter (LSC) coupled to a critical load and configured to support the critical load by boosting voltage at load terminals through autonomous injection of reactive current;
   a DC energy storage coupled to the SSC and the LSC;
   a bypass connection between the AC source and the critical load, the bypass connection including a ride-through inductor with measurement capability;
   one or more sensors configured to measure electrical parameters associated with the bypass connection; and
   a controller configured to:
      (i) operate the SSC and the LSC during nominal source conditions to minimize power flow through the SSC and the LSC and transfer a majority of load power through the bypass connection;
      (ii) compensate for critical load variations using either the SSC or LSC or both based on bypass connection measurements;
      (iii) operate the LSC during abnormal source conditions to inject reactive power to the critical load through the ride-through inductor and to maintain stable voltage and frequency without requiring opening of the bypass connection; and
      (iv) maintain terminal AC voltage of the LSC synchronized with AC source voltage to enable seamless bypass breaker reclosure after fault clearance.

2. The system of claim 1, wherein the bypass connection comprises a breaker in series with the ride-through inductor, which is configured to be opened due to abnormal AC source conditions or for maintenance purposes.

3. The system of claim 1, wherein the sensors are configured to measure both current and voltage.

4. The system of claim 1, wherein the controller is further configured to autonomously return the SSC to pre-fault load level at fault clearance so that the AC source sees consistent load level.

5. The system of claim 1, wherein each of the SSC and LSC is coupled to a separate DC energy storage device.

* * * * *